(12) United States Patent
Jacobsson et al.

(10) Patent No.: US 8,940,216 B2
(45) Date of Patent: Jan. 27, 2015

(54) DEVICE AND METHOD FOR COMPRESSING AN EDGE OF A BUILDING PANEL AND A BUILDING PANEL WITH COMPRESSED EDGES

(75) Inventors: Jan Jacobsson, Viken (SE); Peter Wingardh, Viken (SE)

(73) Assignee: Valinge Innovation AB, Viken (SE)

( * ) Notice: Subject to any disclaimer, the term of this patent is extended or adjusted under 35 U.S.C. 154(b) by 406 days.

(21) Appl. No.: 11/822,694

(22) Filed: Jul. 9, 2007

(65) Prior Publication Data

US 2008/0066425 A1 Mar. 20, 2008

Related U.S. Application Data

(63) Continuation of application No. 11/521,439, filed on Sep. 15, 2006.

(51) Int. Cl.
| | | |
|---|---|---|
| *B29C 43/18* | (2006.01) | |
| *B29C 43/08* | (2006.01) | |
| *B27N 3/06* | (2006.01) | |
| *B27N 3/08* | (2006.01) | |
| *B29C 70/68* | (2006.01) | |
| *E04F 15/02* | (2006.01) | |
| *B29C 33/60* | (2006.01) | |
| *B29C 37/00* | (2006.01) | |
| *B29C 43/04* | (2006.01) | |
| *E04F 15/04* | (2006.01) | |

(52) U.S. Cl.
CPC .............. *B29C 43/184* (2013.01); *B29C 43/08* (2013.01); *B29C 33/60* (2013.01); *B27N 3/06* (2013.01); *B27N 3/083* (2013.01); *B29C 70/682* (2013.01); *E04F 15/02* (2013.01); *E04F 15/02033* (2013.01); *B29C 2037/92* (2013.01); *B29C 2043/043* (2013.01); *E04F 15/04* (2013.01); *E04F 2201/0153* (2013.01)
USPC ........... 264/320; 264/293; 264/319; 264/323; 100/92; 100/327; 425/101; 425/363

(58) Field of Classification Search
USPC ............ 264/319, 293, 320, 323; 100/327, 92; 425/101, 363
See application file for complete search history.

(56) References Cited

U.S. PATENT DOCUMENTS

| 1,568,605 A | 1/1926 | Hough |
| 1,790,178 A | 1/1931 | Sutherland |
| 2,082,186 A | 6/1937 | Staude |

(Continued)

FOREIGN PATENT DOCUMENTS

| CH | 690 242 A5 | 6/2000 |
| CN | 2095236 U | 2/1992 |

(Continued)

OTHER PUBLICATIONS

Machine Translation of JP 2003-200405, Kato et al., Jul. 15, 2003.*

(Continued)

*Primary Examiner* — Atul P. Khare
(74) *Attorney, Agent, or Firm* — Buchanan Ingersoll & Rooney P.C.

(57) ABSTRACT

A device and method of producing a building panel with a compressed and curved edge including a press tool, a heat device and a lubricating device and a building panel with a curved edge produced by the device and method.

27 Claims, 3 Drawing Sheets

(56) References Cited

U.S. PATENT DOCUMENTS

| | | | |
|---|---|---|---|
| 2,269,926 A | 1/1942 | Crooks | |
| 2,497,837 A | 2/1950 | Nelson | |
| 2,679,231 A | 5/1954 | Pomper et al. | |
| 2,791,983 A | 5/1957 | Driskell | |
| 2,811,133 A | 10/1957 | Heino | |
| 2,872,712 A | 2/1959 | Brown et al. | |
| 2,893,468 A * | 7/1959 | Fieroh | 156/389 |
| 3,050,758 A | 8/1962 | Wilkins | |
| 3,339,525 A | 9/1967 | Roberts | |
| 3,341,351 A | 9/1967 | Brewer | |
| 3,354,867 A | 11/1967 | Pomper | |
| 3,440,790 A | 4/1969 | Nerem | |
| 3,508,523 A | 4/1970 | Meerleer | |
| 3,627,608 A | 12/1971 | Steiner et al. | |
| 3,825,381 A | 7/1974 | Dunning et al. | |
| 3,932,258 A | 1/1976 | Brinkman et al. | |
| 3,998,181 A | 12/1976 | Bellen et al. | |
| 4,004,774 A * | 1/1977 | Houston | 249/114.1 |
| 4,054,477 A | 10/1977 | Curran | |
| 4,076,880 A | 2/1978 | Geschwender | |
| 4,084,996 A | 4/1978 | Wheeler | |
| 4,102,975 A | 7/1978 | Doerer | |
| 4,147,448 A * | 4/1979 | Jeffery | 404/124 |
| RE30,233 E | 3/1980 | Lane et al. | |
| 4,290,248 A | 9/1981 | Kemerer et al. | |
| 4,612,074 A | 9/1986 | Smith | |
| 4,645,481 A | 2/1987 | Klapp | |
| 4,716,700 A | 1/1988 | Hagemeyer | |
| 4,751,957 A | 6/1988 | Vaught | |
| 4,850,838 A | 7/1989 | Wagner et al. | |
| 5,096,408 A | 3/1992 | Bielfeldt | |
| 5,111,579 A | 5/1992 | Andersen | |
| 5,190,088 A | 3/1993 | Thomassen et al. | |
| 5,213,819 A * | 5/1993 | Bielfeldt | 425/371 |
| 5,322,584 A | 6/1994 | Severson | |
| 5,349,796 A | 9/1994 | Meyerson | |
| 5,497,589 A | 3/1996 | Porter | |
| 5,582,906 A | 12/1996 | Romesberg et al. | |
| 5,587,218 A | 12/1996 | Betz | |
| 5,613,894 A | 3/1997 | Delle Vedove | |
| 5,641,553 A | 6/1997 | Tingley | |
| 5,671,575 A | 9/1997 | Wu | |
| 5,728,476 A * | 3/1998 | Harwood et al. | 428/500 |
| 5,755,068 A | 5/1998 | Ormiston | |
| 5,797,237 A | 8/1998 | Finkell | |
| 6,006,486 A | 12/1999 | Moriau et al. | |
| 6,101,778 A | 8/2000 | Martensson | |
| 6,115,926 A | 9/2000 | Robell | |
| 6,126,883 A | 10/2000 | Troetscher et al. | |
| 6,146,252 A | 11/2000 | Martensson | |
| 6,180,211 B1 | 1/2001 | Held | |
| 6,260,326 B1 | 7/2001 | Muller-Hartburg | |
| 6,332,733 B1 | 12/2001 | Hamberger | |
| 6,345,481 B1 | 2/2002 | Nelson | |
| 6,374,880 B2 | 4/2002 | Macpherson | |
| 6,401,415 B1 | 6/2002 | Garcia | |
| 6,446,405 B1 | 9/2002 | Pervan | |
| 6,532,709 B2 | 3/2003 | Pervan | |
| 6,617,009 B1 * | 9/2003 | Chen et al. | 428/195.1 |
| 6,647,689 B2 | 11/2003 | Pletzer et al. | |
| 6,679,011 B2 | 1/2004 | Beck et al. | |
| 6,725,891 B2 | 4/2004 | Ledinek et al. | |
| 6,766,622 B1 | 7/2004 | Thiers | |
| 6,769,218 B2 | 8/2004 | Pervan | |
| 6,786,019 B2 | 9/2004 | Thiers | |
| 6,833,039 B2 | 12/2004 | Andersen et al. | |
| 6,922,964 B2 | 8/2005 | Pervan | |
| 7,022,189 B2 | 4/2006 | Delle Vedove et al. | |
| 7,047,697 B1 | 5/2006 | Heath | |
| 7,101,438 B2 | 9/2006 | Suzuki | |
| 7,137,229 B2 | 11/2006 | Pervan | |
| 7,171,791 B2 | 2/2007 | Pervan | |
| 7,386,963 B2 | 6/2008 | Pervan | |
| 7,584,583 B2 | 9/2009 | Bergelin et al. | |
| 7,866,115 B2 | 1/2011 | Pervan | |
| 7,926,234 B2 | 4/2011 | Pervan | |
| 8,042,484 B2 | 10/2011 | Pervan | |
| 8,215,078 B2 | 7/2012 | Pervan | |
| 8,261,504 B2 | 9/2012 | Håkansson | |
| 8,323,016 B2 | 12/2012 | Jacobsson | |
| 8,429,872 B2 | 4/2013 | Pervan | |
| 8,591,691 B2 | 11/2013 | Wallin | |
| 8,683,698 B2 | 4/2014 | Pervan et al. | |
| 2002/0014047 A1 | 2/2002 | Thiers | |
| 2002/0023702 A1 | 2/2002 | Kettler | |
| 2002/0056245 A1 | 5/2002 | Thiers | |
| 2002/0100231 A1 | 8/2002 | Miller et al. | |
| 2002/0189183 A1 | 12/2002 | Ricciardelli | |
| 2003/0041545 A1 | 3/2003 | Stanchfield | |
| 2003/0101674 A1 | 6/2003 | Pervan | |
| 2003/0159385 A1 | 8/2003 | Thiers | |
| 2004/0031227 A1 | 2/2004 | Knauseder | |
| 2004/0035077 A1 | 2/2004 | Martensson | |
| 2004/0035078 A1 | 2/2004 | Pervan | |
| 2004/0062937 A1 | 4/2004 | Lyons | |
| 2004/0108625 A1 | 6/2004 | Moder et al. | |
| 2004/0177584 A1 | 9/2004 | Pervan | |
| 2004/0182036 A1 | 9/2004 | Sjoberg et al. | |
| 2004/0244611 A1 | 12/2004 | Ramcke | |
| 2004/0255541 A1 | 12/2004 | Thiers et al. | |
| 2005/0028474 A1 | 2/2005 | Kim | |
| 2005/0138881 A1 | 6/2005 | Pervan | |
| 2005/0161468 A1 | 7/2005 | Wagner | |
| 2005/0166514 A1 | 8/2005 | Pervan | |
| 2005/0235593 A1 | 10/2005 | Hecht | |
| 2005/0281997 A1 | 12/2005 | Grah | |
| 2006/0048474 A1 | 3/2006 | Pervan et al. | |
| 2006/0073320 A1 | 4/2006 | Pervan et al. | |
| 2006/0099386 A1 | 5/2006 | Smith | |
| 2006/0110490 A1 | 5/2006 | Nien | |
| 2006/0144004 A1 | 7/2006 | Nollet et al. | |
| 2006/0179773 A1 | 8/2006 | Pervan | |
| 2006/0260253 A1 * | 11/2006 | Brice | 52/588.1 |
| 2007/0175143 A1 | 8/2007 | Pervan et al. | |
| 2007/0175144 A1 | 8/2007 | Hakansson | |
| 2007/0175148 A1 | 8/2007 | Bergelin et al. | |
| 2007/0175156 A1 | 8/2007 | Pervan et al. | |
| 2007/0232205 A1 | 10/2007 | Delle VeDove | |
| 2008/0000179 A1 | 1/2008 | Pervan et al. | |
| 2008/0000183 A1 | 1/2008 | Bergelin et al. | |
| 2008/0000190 A1 | 1/2008 | Hakansson | |
| 2008/0000417 A1 | 1/2008 | Pervan et al. | |
| 2008/0005989 A1 | 1/2008 | Pervan et al. | |
| 2008/0028707 A1 | 2/2008 | Pervan | |
| 2008/0034701 A1 | 2/2008 | Pervan | |
| 2008/0066425 A1 | 3/2008 | Jacobsson | |
| 2008/0120938 A1 | 5/2008 | Jacobsson et al. | |
| 2008/0226865 A1 | 9/2008 | Ljosland et al. | |
| 2008/0263975 A1 | 10/2008 | Mead | |
| 2009/0155612 A1 | 6/2009 | Pervan et al. | |
| 2010/0092731 A1 | 4/2010 | Pervan et al. | |
| 2010/0300030 A1 | 12/2010 | Pervan et al. | |
| 2011/0146188 A1 | 6/2011 | Wallin et al. | |
| 2011/0154665 A1 | 6/2011 | Pervan | |
| 2011/0154763 A1 | 6/2011 | Bergelin et al. | |
| 2012/0233953 A1 | 9/2012 | Pervan et al. | |
| 2012/0279154 A1 | 11/2012 | Bergelin et al. | |
| 2013/0055950 A1 | 3/2013 | Pervan | |
| 2013/0263546 A1 | 10/2013 | Pervan | |
| 2014/0069044 A1 | 3/2014 | Wallin | |
| 2014/0166201 A1 | 6/2014 | Pervan | |

FOREIGN PATENT DOCUMENTS

| | | |
|---|---|---|
| CN | 1376230 A | 10/2002 |
| DE | 199 07 939 C1 | 5/2000 |
| DE | 200 06 143 U1 | 7/2000 |
| DE | 200 13 380 U1 | 11/2000 |
| DE | 199 25 248 A1 | 12/2000 |
| DE | 100 32 204 C1 | 7/2001 |
| DE | 100 08 166 A1 | 9/2001 |
| DE | 100 08 166 C2 | 9/2001 |
| DE | 100 34 407 C1 | 10/2001 |
| DE | 100 57 901 A1 | 6/2002 |

(56) References Cited

FOREIGN PATENT DOCUMENTS

| | | |
|---|---|---|
| DE | 202 06 460 U1 | 8/2002 |
| DE | 102 32 508 C1 | 12/2003 |
| DE | 203 14 850 U1 | 1/2004 |
| DE | 203 17 527 U1 | 1/2004 |
| DE | 20 2004 001 038 U1 | 4/2004 |
| DE | 103 43 441 B3 | 5/2005 |
| DE | 20 2005 006 300 U1 | 7/2005 |
| EP | 0 487 925 A1 | 6/1992 |
| EP | 0 661 135 A1 | 7/1995 |
| EP | 0 661 135 B1 | 12/1998 |
| EP | 1 048 423 A2 | 11/2000 |
| EP | 1 146 182 A2 | 10/2001 |
| EP | 1 215 352 A2 | 6/2002 |
| EP | 1 228 812 A1 | 8/2002 |
| EP | 1 338 344 A2 | 8/2003 |
| EP | 1 357 239 A2 | 10/2003 |
| EP | 1 357 239 A3 | 10/2003 |
| EP | 1 437 457 A2 | 7/2004 |
| EP | 1 048 423 B9 | 5/2005 |
| EP | 1 593 795 A1 | 11/2005 |
| EP | 1 691 005 A1 | 8/2006 |
| FR | 2 846 023 A | 4/2004 |
| GB | 1 394 621 | 5/1975 |
| GB | 2 256 023 A | 11/1992 |
| JP | 48-071434 A | 9/1973 |
| JP | 49-031028 B | 8/1974 |
| JP | 50-151232 A | 12/1975 |
| JP | 55-099774 U | 7/1980 |
| JP | 57-162668 A | 10/1982 |
| JP | 57 185110 A | 11/1982 |
| JP | 6-280376 A | 10/1994 |
| JP | 8-033861 A | 2/1996 |
| JP | 8-086080 A | 4/1996 |
| JP | 9-088315 A | 3/1997 |
| JP | 2000-079602 A | 3/2000 |
| JP | 2000-226932 A | 8/2000 |
| JP | 2001-179710 A | 7/2001 |
| JP | 2001-254503 A | 9/2001 |
| JP | 2001-260107 A | 9/2001 |
| JP | 2002-276139 A | 9/2002 |
| JP | 2002-371635 A | 12/2002 |
| JP | 2003-126759 A | 5/2003 |
| JP | 2003-200405 A | 7/2003 |
| JP | 2004-027626 A | 1/2004 |
| KR | 10 2007 0000322 A | 1/2007 |
| SE | 506 254 C2 | 11/1997 |
| SE | 525 661 C2 | 3/2005 |
| SU | 1680359 A1 | 9/1991 |
| WO | WO 94/26999 A1 | 11/1994 |
| WO | WO 97/19232 A1 | 5/1997 |
| WO | WO 97/47834 A1 | 12/1997 |
| WO | WO 98/38401 A1 | 9/1998 |
| WO | WO 99/66152 A1 | 12/1999 |
| WO | WO 00/20705 A1 | 4/2000 |
| WO | WO 01/02103 A2 | 1/2001 |
| WO | WO 01/48331 A1 | 7/2001 |
| WO | WO 01/53628 A1 | 7/2001 |
| WO | WO 01/66877 A1 | 9/2001 |
| WO | WO 01/96688 A1 | 12/2001 |
| WO | WO 02/055809 A1 | 7/2002 |
| WO | WO 02/055810 A1 | 7/2002 |
| WO | WO 02/060691 A1 | 8/2002 |
| WO | WO 03/012224 A1 | 2/2003 |
| WO | WO 03/018210 A1 | 3/2003 |
| WO | WO 03/025307 A1 | 3/2003 |
| WO | WO 03/035352 A1 | 5/2003 |
| WO | WO 03/069094 A1 | 8/2003 |
| WO | WO 03/070384 A1 | 8/2003 |
| WO | WO 03/078761 A1 | 9/2003 |
| WO | WO 03/099461 A1 | 12/2003 |
| WO | WO 2004/053257 A1 | 6/2004 |
| WO | WO 2005/054600 A1 | 6/2005 |
| WO | WO 2005/068747 A1 | 7/2005 |
| WO | WO 2005/077625 A1 | 8/2005 |
| WO | WO 2005/110677 A1 | 11/2005 |
| WO | WO 2006/008578 A1 | 1/2006 |
| WO | WO 2006/031169 A1 | 3/2006 |
| WO | WO 2006/038867 A1 | 4/2006 |
| WO | WO 2006/043893 A1 | 4/2006 |
| WO | WO 2006/058548 A1 | 6/2006 |
| WO | WO 2006/066776 A2 | 6/2006 |
| WO | WO 2006/088417 A2 | 8/2006 |
| WO | WO 2006/111437 A1 | 10/2006 |
| WO | WO 2006/113757 A2 | 10/2006 |
| WO | WO 2007/081260 A1 | 7/2007 |
| WO | WO 2007/081260 A1 | 7/2007 |
| WO | WO 2008/033081 A1 | 3/2008 |

OTHER PUBLICATIONS

Pervan, Darko, et al., U.S. Appl. No. 13/045,631, entitled "Floorboards with Decorative Grooves," filed in the U. S. Patent and Trademark Office on Mar. 11, 2011.

Bergelin, Marcus, et al., U.S. Appl. No. 13/046,011, entitled "Resilient Groove," filed in the U. S. Patent and Trademark Office on Mar. 11, 2011.

U.S. Appl. No. 13/667,770, Pervan et al.

Pervan, Darko, et al., U.S. Appl. No. 13/667,770, entitled "Appliance and Method for Surface Treatment of a Board Shaped Material and Floorboard," filed in the U.S. Patent and Trademark Office on Nov. 2, 2012.

Wallin, Magnus, U.S. Appl. No. 14/059,523, entitled "Methods and Arrangements Relating to Surface Forming of Building Panels," filed in the U.S. Patent and Trademark Office on Oct. 22, 2013.

International Search Report issued in PCT/SE2007/000805, Dec. 10, 2007, Swedish Patent Office, Stockholm, Sweden, 6 pages.

Pervan, Darko, U.S. Appl. No. 13/853,722, entitled "Building Panel with Compressed Edges and Method of Making Same," filed in the U.S. Patent and Trademark Office on Mar. 29, 2013.

Pervan, Darko, et al., U.S. Appl. No. 14/184,382 entitled "Floorboards With Decorative Grooves," filed in the U.S. Patent and Trademark Office on Feb. 19, 2014.

European Search Report issued in related EP 05 00 3173, The Hague, Jul. 11, 2005.

International Search Report and Written Opinion issued in related PCT/SE2006/000209, ISA Stockholm, SE, Aug. 15, 2006.

* cited by examiner

Prior Art

DEVICE AND METHOD FOR COMPRESSING AN EDGE OF A BUILDING PANEL AND A BUILDING PANEL WITH COMPRESSED EDGES

AREA OF INVENTION

The present invention generally relates to a device and a method of compressing an edge of a building panels, especially floorboards, which have a wood fibre based core and a decorative layer, to provide curved edge portions. More particularly, the present invention relates to interlocked building panels with compressed edge portions located below the panel surface. The invention relates to panels with such edge portions and to a method and device to produce such panels.

BACKGROUND OF THE INVENTION

In particular, yet not restrictive manner, the present application concerns a device and a method of producing a laminate floor panel with a curve shaped and compressed edge. However, the application is as well applicable to building panels in general. More particularly, the application relates to the type of floor panels with a wood fibre based core, e.g. HDF, MDF, particleboard, plywood, a decorative layer and a mechanically locking system for horizontal and/or vertical locking produced by the method and device.

A device, method and floor panel of this type is presented in WO2006/088417, which discloses a device and method to compress the edges of a laminate floor panel to provide a laminate floor panel with curve shaped edges looking like a solid wood floor panel with bevelled edges.

The contents of WO2006/088417 and U.S. Ser. No. 10/906,356 are hereby incorporated herein by reference.

SUMMARY

The invention aims at an improved device and a method of producing building panels, especially floorboards, with a curved edge portion made in one piece with the decorative layer, which could be produced with high speed. The invention 5 also makes it possible to produce deeper curved edge portion compared to the known technology.

An additional purpose of this invention is to provide building panels comprising a decorative layer and a curved edge portion, produced with the device and the method.

A device, method and floor panel of this type is known from WO2006/088417, which discloses a device and method to compress the edges of a laminate floor panel, to provide a laminate floor panel with a curve shaped edge. The known device comprises a heat device and a press tool for heating and compressing the edge part of the panel.

The known method comprises the steps of:
Applying the decorative layer on the core to form a building element.
Cutting the building element into building panels.
Applying heat and pressure on the surface of an edge portion of the building panel such that the core under the decorative layer is compressed and the surface layer is permanently bent towards the rear side of the core.

A drawback of this known device and method is that cracks arise in the decorative layer if the pressure is applied to fast or if the degree of compression is to high.

One embodiment according to the invention comprises a 30 heat device, a press tool and a lubricating device for produce building panels with high speed.

Advantageously, the tool is arranged rotatable and is configured to rotate when applying the pressure on the edge of the building panel.

Preferably, the lubricating device is arranged to apply the lubricate additive at the press tool. The lubricate additive may be of any type of grease or oil easy to wipe of from the present type of decorative surface. A preferred example is synthetic teflon oil, but it is also possible to use a mineral and an organic oil with the same fluid and lubricating properties, which is possible to remove from the decorative surface.

Preferably, the heating device comprises an IR (infra red) heat element. In a preferred embodiment also the tool is heated.

Preferably, the shape of the tool comprises an elliptic groove, with a larger radius in a plane parallel to decorative surface and consequently the smaller in a plane vertical to the decorative surface. This results in a bevel, which looks deeper/bigger.

Preferably, the surface of the tool is grinded. This results in lower friction between the decorative surface and the press tool, resulting in fewer cracks in the decorative surface.

An object of the invention is to provide an improved method to produce a building panel with a compressed edge. One embodiment of the invention includes the method comprising:
Heating an edge of the building panel.
Lubricating the edge of the building panel or an press tool
Compressing the edge of the building panel with the press tool Advantageously, the method may also comprises heating of the tool.

Preferably, the method comprises moving the building panel relative the tool via a conveyor. The speed of the conveyor is preferably more than 50 m/min and most preferably 100 m/min or higher.

Another object is to provide an improved building panel with a curved edge, produced by the device and method afore mentioned. The building panel preferably has an elliptic outer edge. Advantageously, the core at the curve shaped edge is compressed more than 0.5 mm and most preferably more than 0.7 mm. A preferred range of compression is between 0.5 mm to 1 mm. With the method and the device according to the invention it is possible to produce a building panel with such a deep compression without cracks in the decorative surface.

Building panels with a curved edge portion are described in WO2006/088417. Two main types of curved edges are shown in WO2006/088417, the old type, which involves cutting of a part of the core at the edge of the building panel or pressing the whole building panel, forming the curve shape, and a new type involving compression of the edges. The two types may look the same but the new type has a compressed core, with higher density, at the edge. WO2006/088417 also disclose a measuring method for distinguishing the two types. A building board according to the invention is possible to distinguish from the old types with the measuring method described in WO2006/088417 and from the new type that there are fewer or no cracks in the decorative surface at the curved edge. The difference is increased with larger radius and degree of compression.

All references to "a/an/the [element, device, component, means, step, etc]" are to be interpreted openly as referring to at least one instance of said element, device, component, means, step, etc., unless explicitly stated otherwise.

DESCRIPTION OF EMBODIMENTS OF THE INVENTION

As represented in FIGS. 2-5, an embodiment of the invention relates to a device and a method of producing a building panel with a compressed and curved edge and a building panel produced by the device and method.

Figure 1A:
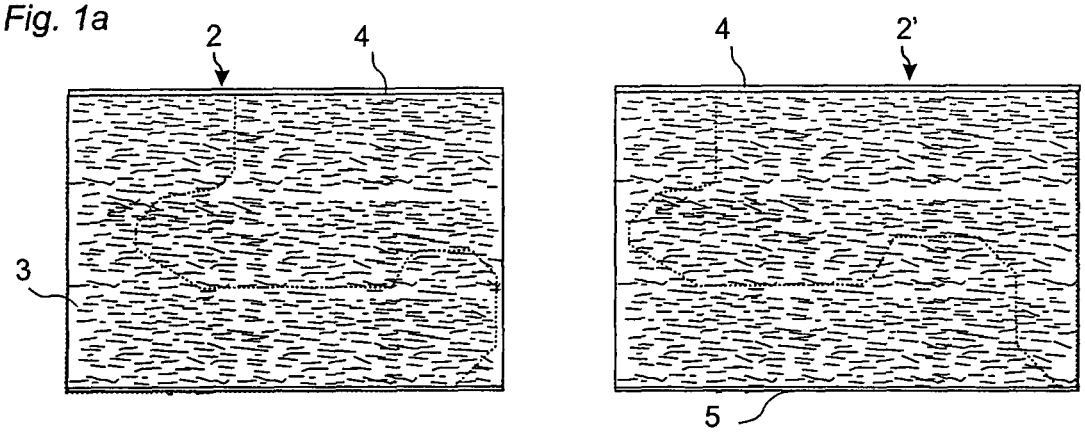
FIGS. 1a-c illustrate a device and method according to known technology.
Figure 1B:
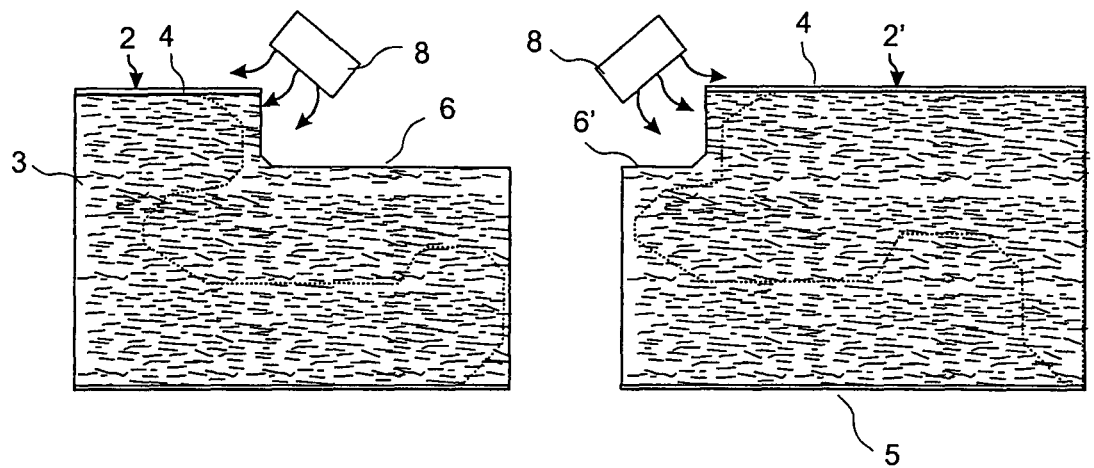
Figure 1C:
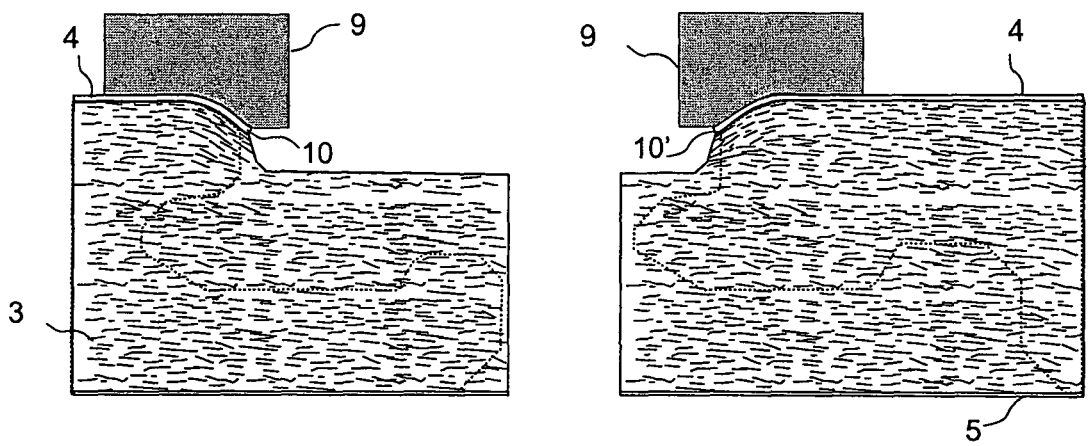
Figure 2:
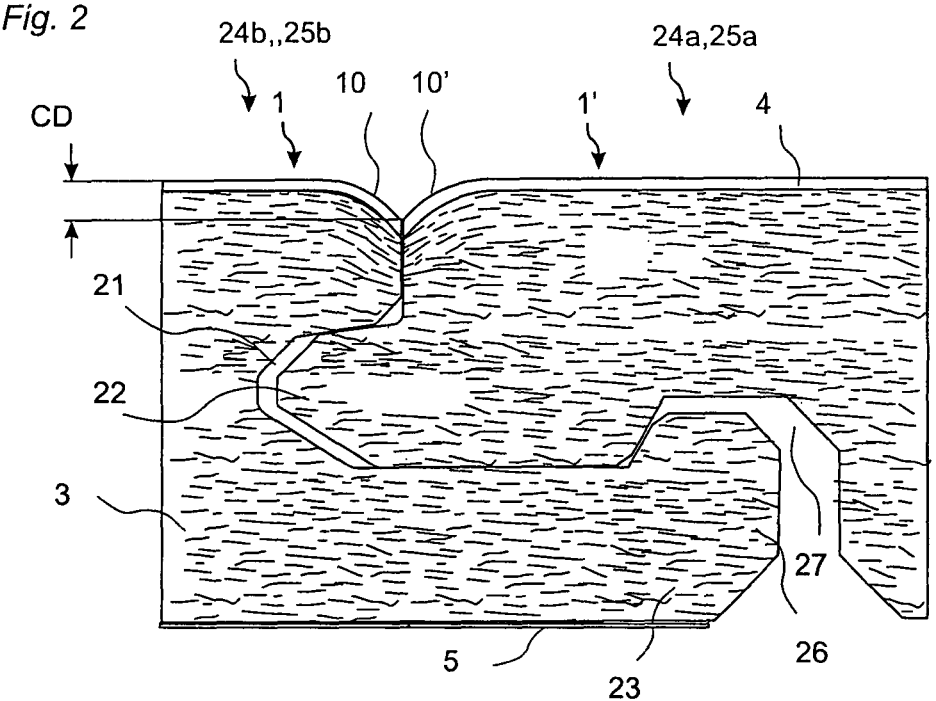
FIGS. 2-3 illustrate an embodiment of a building panel according to the invention.
Figure 3:
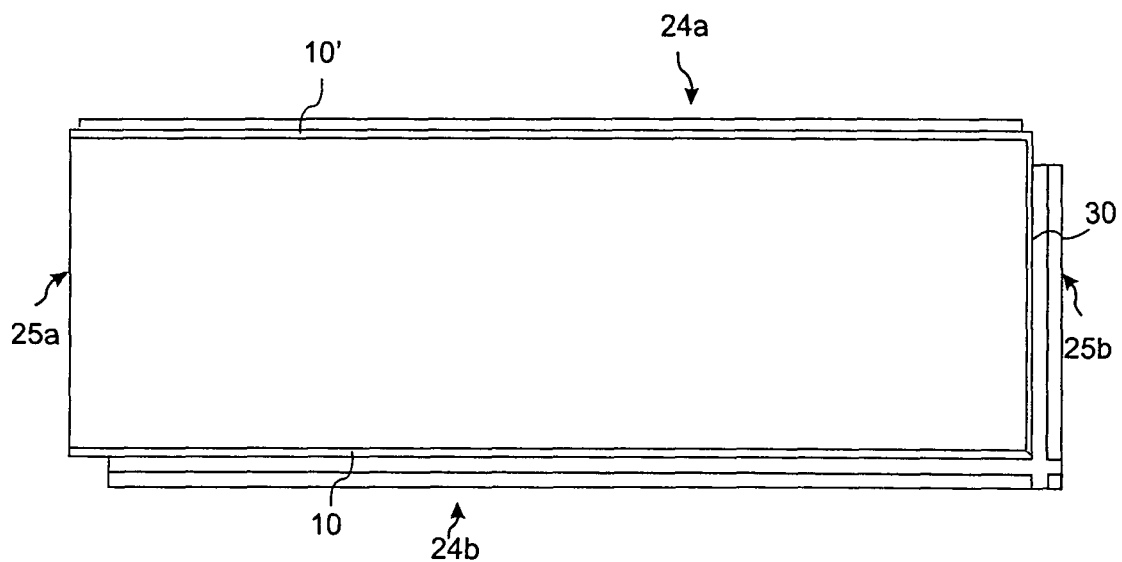

A known device and method of producing a building panel with compressed and curved edges is shown with reference to FIGS. 1a-1c. In FIGS. 2 and 3 an embodiment of a building panel according to the invention is shown, produced by a device and a method according to the invention and provided with a well-known mechanical locking system.

FIGS. 1a-c show in three steps the known method of forming the compressed edge. In FIG. 1a a building element is shown, which in a later step, FIG. 1b, is cut in to two buildings element (2, 2') and provided with an edge groove 5 (6, 6'). The building element comprises a core (3), of a wood fibre based material, preferably HDF, MDF or particle board, a decorative surface (4) of a wood veneer, a laminate comprising paper sheets and a resin or a decorative printing and a balancing layer (5). A mechanical locking system, which 10 will be produced at a later stage, is indicated by a dotted line. In the second step heat is applied to the edges by a heat device (8). In the third step, illustrated in FIG. 1c, a press tool (9) compresses the core at the edge of the building panel and forms the curve shape (10, 10').

In FIG. 2 an embodiment of the invention comprising a joint between two floor panels (1, 1') with the compressed and curved edges (10, 10') is shown. An example of a mechanical locking system is shown for vertical and horizontal locking. The horizontal locking comprises a locking strip (23), extending horizontally from a edge (24b, 24b) of a first floor panel (1) and provided with an upwardly projecting locking element (26), which cooperates with a locking groove (27) under and at the edge (24a, 25a) of a second floorboard (1') The vertical locking comprises a tongue (21) at the edge (24b, 25b) of the first panel and a tongue groove (21) at the edge (24a, 25a) of the second floor panel (1'). Any type of locking may be used, e.g only vertical, only horizontal, a tongue lock (see WO02/055810) or in addition glue may be added.

FIG. 3 shows an embodiment of the floor panel provided with the mechanical locking system and curved edges (10, 10') at a long edges and a decorative groove (30) at only one of the opposite short edges (25a, 25b).

Figure 4:
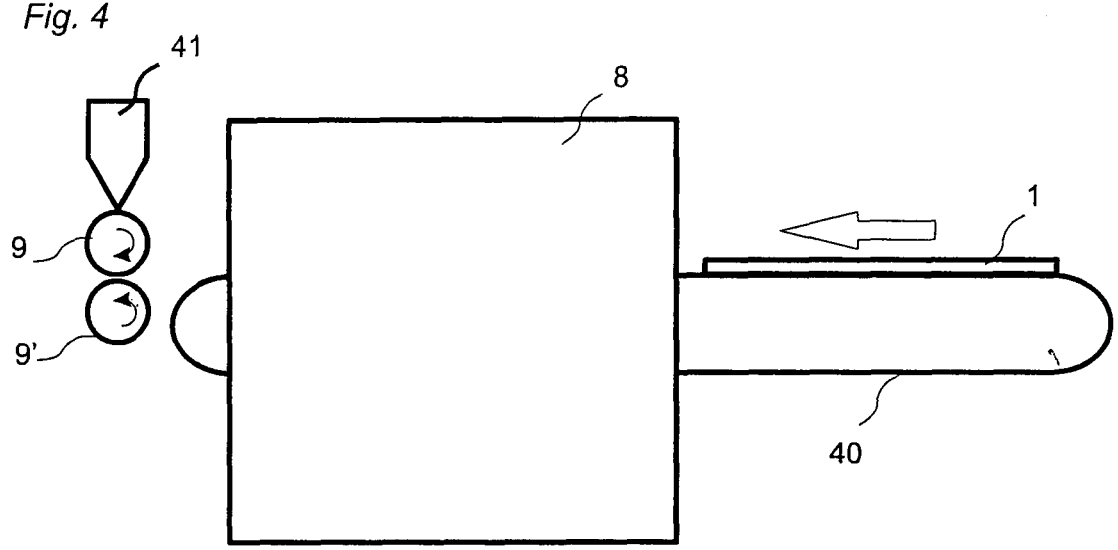
FIG. 4 illustrates an embodiment of the device and method 15 according to the invention
Figure 5:
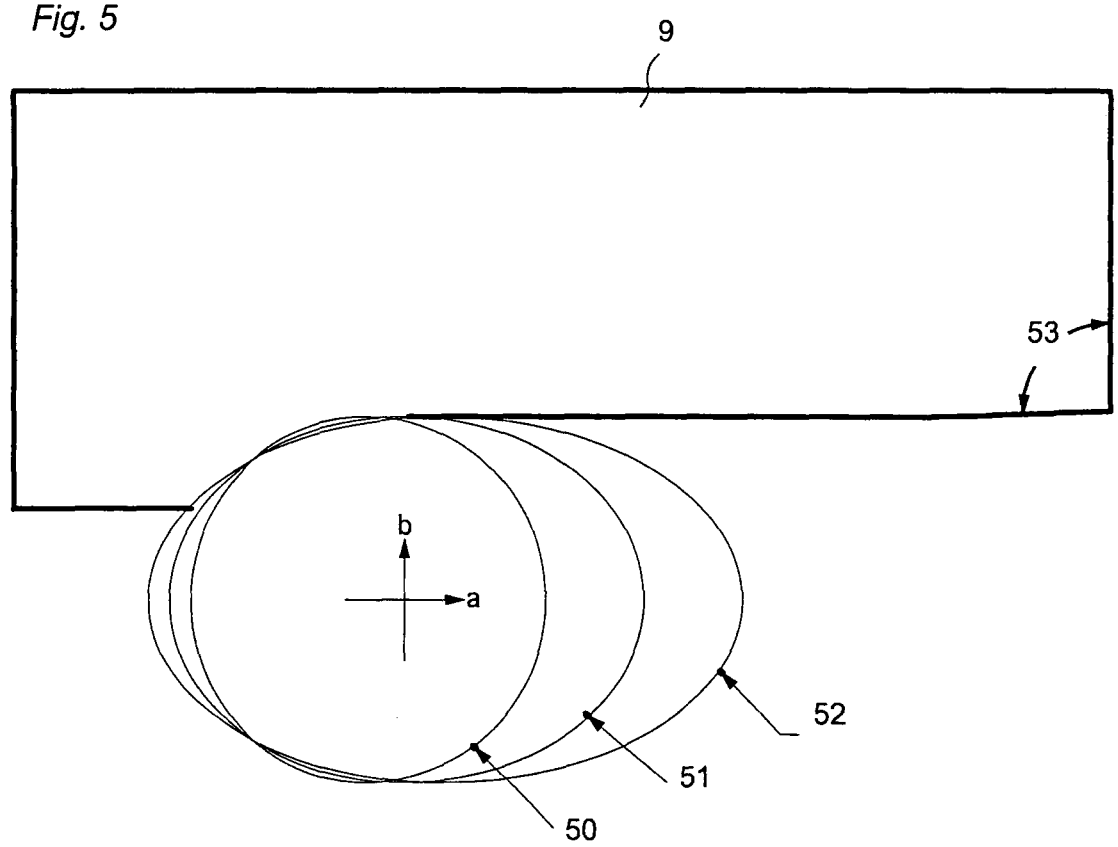
FIG. 5 illustrates an embodiment of the press tool according to the invention, for compressing and forming of an edge portion of a building panel.

An embodiment of the device and method according to the invention is illustrated in FIG. 4. The device comprising a conveyor (40) for moving a building panel (2) to a heat device (8). The heat device, e.g. infra-red heat element, is arranged for heating an edge of the building element. In a second step the conveyor moves the building panel to a press tool for compressing the edge of building panel. Preferably both opposite edges are heated and subsequently compressed at the same time by a rotating press tool. The device also comprises a lubricating device (41) arranged for applying a lubricate additive, preferably to the press tool or to the edge of the building panel.

A preferred lubricate additive is a synthetic teflon oil, but it is also possible to use a mineral and a organic oil with the same fluid and lubricating properties, which is possible to remove from the decorative surface. To reduce the friction further more, the surface of the press tool (9) may be grinded and/or tempered. As an example a material of tempered steel with a hardness of about 30-40 HRC may be used for the press tool, which may be tempered by nitro-carburizing to about 60-70 HRC and advantageously grinded to a roughness of about 0.2 Ra. Other method may be used for tempering for which a hardness may be achieved of about 30004000 Vickers. Generally, a harder and smoother press tool is desired, but leads to greater costs. For some material of the decorative layer and a compression in the lower range, it's possible to take out the lubrication and achieve the desired result by a grinded and tempered press tool.

Advantageously, the press tool (9) may be provided with a groove with a circular (50) or an elliptic shape (51, 52), which creates a corresponding circular or elliptic shape of the curved edge of the building panel. With an elliptic shape a visual effect is created that the curved edge looks deeper, if the radius of the ellipse in a direction (a), parallel to the decorative surface is larger than the radius of the ellipse in a direction (b), vertical to the decorative surface. The edge of the tool closest the middle of the building panel is preferably provided with a clearance angel (53).

The embodiment of the building panel shown in FIG. 2, produced by the aforementioned device and method according to the invention preferably comprises a core of a wood based material, e.g. HDF or MDF and a decorative layer of a laminate comprising paper sheets and a resin or a decorative printing, which combination is suitable for compression. Also other types of wood based cores, e.g particle board or plywood and other decorative surface may be used, e.g. veneer. Advantageously, the building panel is provided with a balancing layer (5).

Advantageously, the core at the curve shaped edge is compressed more than 0.5 mm and most preferably more than 0.7 mm. A preferred range of compression is between 0.5 mm to 1 mm. Also a smaller degree of compression is obviously possible, and even a larger, but a curved edge or bevel in this range looks the most natural. With the method and the device according to the invention a building panel with such a deep compression is possible to achieve without cracks in the decorative surface. The compressed edge may also comprise a straight part.

The invention claimed is:

1. A method of producing a building panel with a curved edge portion, the building panel including a wood-based core and a decorative surface, wherein the decorative surface comprises a wood veneer or a paper laminate layer, the method comprising:
    heating an edge of a building panel;
    lubricating a press tool at an exterior surface of the press tool that is configured to compress the edge of the building panel, with an oil or grease; and
    after lubricating, compressing the edge of the building panel with the press tool to a curved edge shape so that at least the core at the edge of the building panel has a curved shape, wherein the edge of the board is compressed more than 0.5 mm, and wherein said compressing step compresses both the decorative surface and the core.

2. The method as claimed in claim 1, wherein the method comprises heating the tool.

3. The method as claimed in claim 1, further comprising moving the building panel relative to the tool via a conveyor.

4. The method as claimed in claim 3, wherein the building panel is moved at 50 m/min or higher.

5. The method as claimed in claim 1, wherein the edge is compressed to a depth of about 0.7 mm or more.

6. The method as claimed in claim 1, wherein the edge is compressed to a depth in the range of about 0.5 mm to 1 mm.

7. The method as claimed in claim 1, wherein the curved edge has an elliptic shape.

8. The method as claimed in claim 1, wherein the curved edge has a circular shape.

9. The method as claimed in claim 1, wherein the decorative surface comprises a wood veneer.

10. The method as claimed in claim 9, wherein the wood veneer extends to an outer edge of the curved edge shape at the curved edge portion.

11. The method as claimed in claim 1, wherein the core comprises HDF or MDF.

12. The method as claimed in claim 1, wherein the decorative surface comprises a paper laminate layer.

13. The method as claimed in claim 12, wherein the paper laminate layer comprises a resin and a paper sheet.

14. The method as claimed in claim 12, wherein the paper laminate paper extends to an outer edge of the curved edge shape at the curved edge portion.

15. The method as claimed in claim 12, wherein the core comprises HDF or MDF.

16. The method as claimed in claim 1, wherein the press tool is rotatable and is configured to rotate when applying pressure on the edge of the building panel.

17. The method as claimed in claim 1, wherein the lubricant is an oil selected from the group consisting of synthetic teflon oil, mineral oil and organic oil.

18. The method as claimed in claim 1, wherein the decorative surface extends to an outer edge of the curved edge shape at the curved edge portion.

19. The method as claimed in claim 1, wherein, the press tool having a surface grinded to a roughness of about 0.2 Ra.

20. The method as claimed in claim 1, wherein said compressing step compresses both the decorative surface and the core so that the core and the decorative surface have a curved shape, and wherein the decorative surface extends to an outer edge of the curved edge shape at the curved edge portion.

21. A method of producing a building panel with a curved edge portion, the method comprising:
heating an edge of a building panel;
lubricating a press tool; and
after lubricating, compressing the edge of the building panel with the press tool to a curved edge shape,
wherein the building panel comprises a decorative surface and a wood-based core, and wherein the decorative surface comprises a wood veneer, and
wherein said compressing step compresses both the decorative surface and the core so that the core and the decorative surface have a curved shape, and wherein the decorative surface extends to an outer edge of the curved edge shape at the curved edge portion.

22. The method as claimed in claim 21, wherein the building panel has a planar surface, including the edge portion, prior to compression, and wherein the step of compressing the edge of the building panel with the press tool involves compressing the entire edge portion from the plane of the planar surface to the curved edge shape.

23. A method of producing a building panel with a curved edge portion, the method comprising:
heating an edge of a building panel;
lubricating a press tool at an exterior surface of the press tool that is configured to compress the edge of the building panel, with an oil or grease, the press tool having a surface that is grinded to a roughness of about 0.2 Ra; and
after lubricating, compressing the edge of the building panel with the press tool to a curved edge shape,
wherein the building panel has a planar surface, including the edge portion, prior to compression, and wherein the step of compressing the edge of the building panel with the press tool involves compressing the entire edge portion from the plane of the planar surface to the curved edge shape,
wherein the building panel comprises a decorative surface and a wood-based core, the core being compressed to have a curved shape by the press tool,
wherein the decorative surface comprises a wood veneer or a paper laminate layer comprising a resin, and
wherein the decorative surface extends to an outer edge of the curved edge shape at the curved edge portion.

24. The method as claimed in claim 23, wherein the decorative surface comprises the wood veneer.

25. The method as claimed in claim 23 wherein the decorative surface comprises the paper laminate layer.

26. The method as claimed in claim 23, wherein the lubricant is an oil selected from the group consisting of synthetic teflon oil, mineral oil and organic oil.

27. A method of producing a building panel with a curved edge portion, the method comprising:
heating an edge of a building panel;
lubricating a press tool; and
after lubricating, compressing the edge of the building panel with the press tool to a curved edge shape,
wherein the building panel comprises a decorative surface of wood veneer or paper laminate and a wood-based core,
wherein the decorative surface extends to an outer edge of the curved edge shape at the curved edge portion, and
wherein the core at the edge of the building panel is compressed by the press tool to have a curved shape.

* * * * *